United States Patent
Bauer et al.

(10) Patent No.: US 8,239,057 B2
(45) Date of Patent: Aug. 7, 2012

(54) CONTROLLING A SLAVE DRIVE WITH DYNAMIC DETERMINATION OF THE DYNAMICS OF THE MASTER AXIS

(75) Inventors: Peter Bauer, Herzogenaurach (DE); Klaus Hertinger, Erlangen (DE); Horst Stiehler, Burgstadt (DE); Tom Tolkmitt, Fürth (DE); Curd Weber, Sulzfeld (DE); Heino De Levie, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 259 days.

(21) Appl. No.: 12/625,804

(22) Filed: Nov. 25, 2009

(65) Prior Publication Data

US 2010/0138047 A1 Jun. 3, 2010

(30) Foreign Application Priority Data

Nov. 26, 2008 (EP) .................................. EP08020567

(51) Int. Cl.
*G06F 19/00* (2011.01)
(52) U.S. Cl. ............................................ 700/188; 700/9
(58) Field of Classification Search .............. 700/9, 178, 700/183, 184, 188, 275
See application file for complete search history.

(56) References Cited

U.S. PATENT DOCUMENTS 6,625,498 B1 * 9/2003 Kurakake et al. ................. 700/3

FOREIGN PATENT DOCUMENTS

| EP | 1353251 A2 | 10/2003 |
| JP | 11327624 A | 11/1999 |
| WO | WO 03005135 A2 | 1/2003 |

* cited by examiner

*Primary Examiner* — Mohammad Ali
*Assistant Examiner* — Carlos Ortiz Rodriguez
(74) *Attorney, Agent, or Firm* — Henry M. Feiereisen; Ursula B. Day; Stefan Knirr (57) ABSTRACT

A method for controlling several master axes in a machine, for example a production machine includes the steps of defining profiles of desired values for a plurality of master axes, determining for each master axis a current desired value and also a current desired value for a slave axis using a logic combination rule, controlling a first drive in accordance with the current desired value of the slave axis, and if the dynamics controlling the first drive exceeds an upper dynamics limit, starting at the next clock pulse to modify determination of the current desired values for at least one of the master axes, and controlling the first drive with a reduced dynamics until the reduced dynamics falls below a lower dynamics limit.

12 Claims, 7 Drawing Sheets

MOD = a component, effected by the respective master axis, of the dynamics D of the relevant slave drive and the relevant dynamics D overall have the same sign — S22

FIG 11

MOD = a component, effected by the respective master axis, of the dynamics D on the relevant slave drive and the relevant dynamics D overall have the same sign AND the transformation information item fulfils a transformation condition — S22

CONTROLLING A SLAVE DRIVE WITH DYNAMIC DETERMINATION OF THE DYNAMICS OF THE MASTER AXIS

CROSS-REFERENCES TO RELATED APPLICATIONS

This application claims the priority of European Patent Application, Serial No. EP08020567, filed Nov. 26, 2008, pursuant to 35 U.S.C. 119(a)-(d), the content of which is incorporated herein by reference in its entirety as if fully set forth herein.

BACKGROUND OF THE INVENTION

The present invention relates to a control device, for example for controlling multi-axes movement of a production machine, a method for operating such control device, and an operating program which can be executed on a control device of this type. The present invention also relates to a data medium on which an operating program is stored in machine-readable form.

Workpieces are sometimes fabricated by performing several processing steps simultaneously. Various procedures are known for preventing application of excess stress on the axes. For example, the possible dynamics of the drives that carry out superposed movements can be divided statically, for example in the ratio of 70:30 or in the ratio of 50:50. It is disadvantageous in this mode of procedure that the possible dynamics of the respective drive is possibly not optimally utilized, thus resulting in suboptimal processing times.

Furthermore, it is known to assign the movements to statically predetermined time intervals. This case also results in suboptimal processing times. Moreover, a—mostly considerable—additional outlay for programming is required.

Theoretically, it is further conceivable to set up in its entirety an appropriate program that utilizes the dynamics in dependence on the nature of the individual case. This mode of procedure is, for one thing, extremely expensive and complex. Moreover, it is scarcely possible to take account of temporally variable magnitudes.

The problems explained above can occur not only with position controlled drives. The same problems can also occur when control of rotational speed, acceleration, torque, etc. is undertaken.

It would therefore be desirable and advantageous to provide an improved control device and operating method to obviate prior art shortcomings and to a time optimized operation is possible in a simple way for axes whose desired values are determined by superposition of a desired value of a master axis and at least one further desired or actual value.

SUMMARY OF THE INVENTION

According to one aspect of the present invention, an operating method for a control device includes the steps of defining for a plurality of master axes a profile of desired values, determining for each master axis a current desired value at a predetermined clock pulse and determining a current desired value for a slave axis with a logic combination rule, wherein the logic combination rule includes at least one current desired value of one of the master axes, and at least one desired or actual value of an additional drive, controlling, at the predetermined clock pulse, a first drive in accordance with the current desired value of the slave axis, checking at each clock pulse if a dynamics, which controls the first drive to the current desired value of the slave axis, exceeds an upper dynamics limit, and if the dynamics controlling the first drive exceeds the upper dynamics limit, the control device, starting at the next clock pulse to modify determination of the current desired values for at least one of the master axes, and controlling the first drive with a reduced dynamics until the reduced dynamics falls below a lower dynamics limit.

The individual processing operations of the workpieces can then still be programmed independently of one another, while the dynamics can be automatically reduced, wherein the dynamics is reduced only when necessary. However, if the activation of the drive in accordance with the logic combination of the unmodified desired values of the master axes is not critical, no reduction of dynamics is performed.

In one embodiment of the present invention, if the dynamics with which the drive is controlled exceeds the upper dynamics limit, the control device decides for each of the master axes independently of the other master axes whether and, if appropriate, to what extent it modifies the determination of the current desired values for this master axis. This refinement simplifies the mode of procedure. A more simple programming results particularly in the case of a software implementation of the operating method.

In another embodiment of the present invention, if the dynamics with which the drive is controlled exceeds the upper dynamics limit, the control device modifies the determination of the current desired values for the respective master axis only whenever a component of the dynamics which is effected by the respective master axis and with which the drive is controlled, and the dynamics with which the drive is controlled have the same sign. As a result of this mode of procedure, the current desired values of master axes are determined in modified fashion only when the respective master axis supplies a "critical" contribution to the activation of the slave drive.

In another embodiment of the present invention, if the dynamics with which the drive is controlled exceeds the upper dynamics limit, the control device modifies the determination of the current desired values for the respective master axis as a function of a transformation ratio with the aid of which a change in the desired values for this master axis effects a change in the desired values for the slave axis. This refinement may have the result, for example, that the determination of the current desired values is modified only for those master axes that feature to a particularly large extent in the current desired values of the slave axis.

In many cases, maximum speeds with which the master axes are to be maximally moved are provided to the control device in addition to the profiles. In another embodiment of the present invention, the control device takes account of the respective maximum speed for each master axis when deciding whether and, if appropriate, to what extent to modify the determination of the current desired values for this master axis. This embodiment utilizes the finding that pure positioning operations that are not connected to processing of a workpiece are often carried out in a rapid movement, whereas processing is mostly carried out at substantially lower speeds. The maximum speed is therefore a simple criterion for distinguishing pure positioning operations from processing operations. Since processing operations are often carried out at specific speeds for technical reasons, whereas pure positioning operations are not speed critical, the speeds of rapid movements should preferably be reduced.

In another embodiment of the present invention, the control device is provided with types in addition to the profiles. In this case, the control device can into consideration for each master axis the respective type when deciding whether and, if appropriate, to what extent to modify the determination of the current desired values for this master axis. The type assignment can, for example, serve to distinguish rapid movements, coarse processing, fine processing and final processing. Other distinctions are also possible. Thus, for example, the modification of the determination of the current desired values for a movement corresponding to a roughing operation (coarse processing) can be more readily tolerated than the modification, for example, for a movement that corresponds to a finishing operation (fine processing) or a grinding operation (final processing).

During operation of the control device states (so-called "exceptions") may occur during which the rate of the operating speed should, if possible and for overriding technical reasons, not be reduced for short times. In one embodiment of the present invention, the control device therefore     receives information while controlling the drive,     uses the received information to determine whether at least one master axis or at least one drive is in a critical state, and     takes into account, whether at least one master axis or at least one drive is in a critical state, when deciding if and to what extent to modify the determination of the current desired values for the master axes.

In a large number of cases, the desired values are desired position values. Alternatively, the desired values can be a time derivative of desired position values, desired torque values or desired force values. Furthermore, the desired values generally are related to one another.

According to another aspect of the invention, an operating program including has machine code can be executed directly by a control device. The execution of the machine code by the control device has the effect that the control device carries out an operating method according to the invention.

According to another aspect of the invention, a data carrier is provided on which such an operating program is stored in machine-readable form.

According to yet another aspect of the invention, a control device for controlling a drive is provided, in which the control device is configured in such a way that during operation it carries out an operating method according to the invention.

According to still another aspect of the invention, a production machine is provided which includes a controlled drive and a control device according to the invention.

BRIEF DESCRIPTION OF THE DRAWING

Other features and advantages of the present invention will be more readily apparent upon reading the following description of currently preferred exemplary embodiments of the invention with reference to the appended drawings, in which.

DETAILED DESCRIPTION OF PREFERRED EMBODIMENTS

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
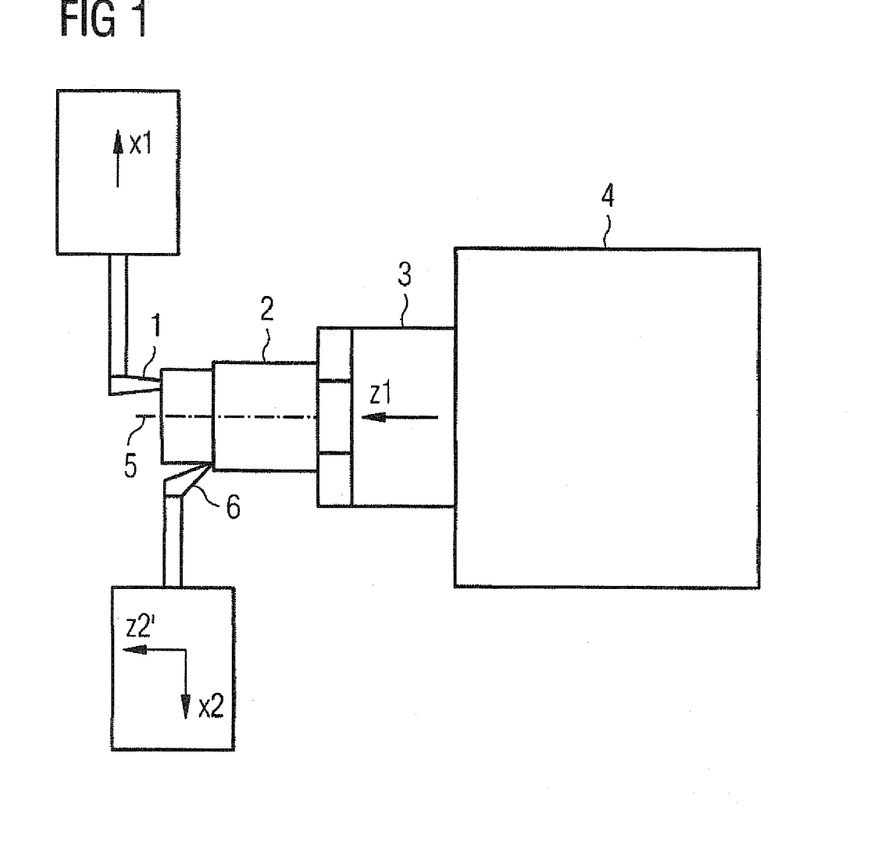
FIG. 1 shows a schematic illustration of one embodiment of a production machine.

FIGS. 1 to 5 relate to machines and machining operations and are provided for a better understanding of the invention. Turning now to FIG. 1, there is shown a first tool 1 for processing a first workpiece 2. For this purpose, the first workpiece 2 is clamped in a workpiece chuck 3 of a first spindle 4 and rotated with a first spindle drive (not illustrated in more detail) about a first spindle axis 5. The rotation of the first spindle 4 about the first spindle axis 5 can be controlled in terms of position or rotational speed, depending on the nature of the individual case. For the sake of simplicity, it is assumed below that the first workpiece 2 is processed in a rotationally symmetrical fashion. In this case, it suffices to control the rotational speed of the first spindle drive.

The first tool 1 can be moved radially with an appropriate radial drive, toward the first spindle axis 5 or away from it.

In order to be able to process the first workpiece Z at different points seen in the direction of the first spindle axis 5, it is necessary to move the first workpiece 2 together with the workpiece chuck 3 of the first spindle 4 with an appropriate first axial drive in a fashion parallel to the first spindle axis 5. The radial movement of the first tool 1, and the axial movement of the first workpiece 2 must—of course—be coordinated with one another. Consequently, a track is defined as a function of a first travel path s1 covered, such that it is known which first radial position x1 is to be assumed by the tip of the first tool 1 for a specific value of the first travel path s1, and which first axial position z1 is to be assumed by the first workpiece 2 for the same value of the first travel path s1. It is therefore known which track must be traveled by the radial drive of the first tool 1 and the axial drive of the first spindle 4. A possible path is illustrated—purely by way of example—in FIG. 2. The appropriate stipulation to a control device (not illustrated in FIG. 1) that drives the first axial drive and the first radial drive correspondingly is known in general to experts.

Figure 2:
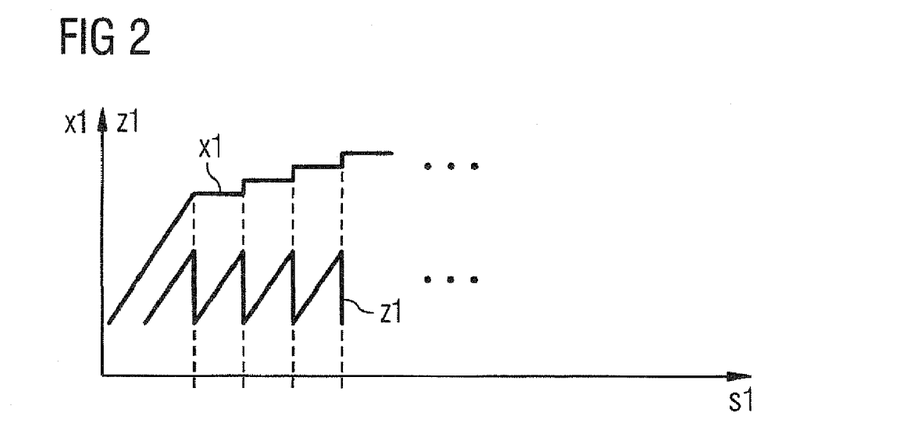
FIGS. 2 and 3 show graphical illustrations of machining tracks.

As a rule, in accordance with the illustration of FIG. 2 the desired position values of a plurality of drives are coupled to one another via the defined path. Alternatively, the movements of the drives can be defined separately.

Figure 3:
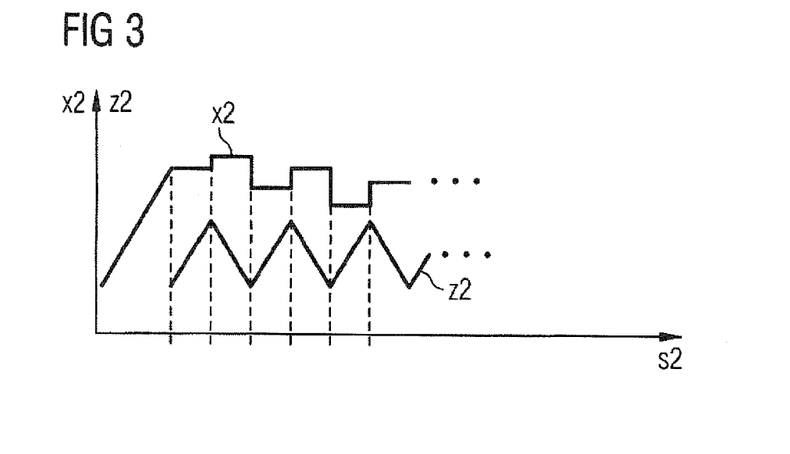

For the purpose of accelerating the fabrication process, for example, the first workpiece 2 is to be processed by a second tool 6 while being simultaneously processed by the first tool 1. In a way similar to the processing by the first tool 1, an appropriate second track curve is defined as a function of a second travel path s2 covered for the processing of the first workpiece 2 by the second tool 6, as well. A possible track is illustrated in FIG. 3 purely by way of example. If a particular value is defined for the second travel path s2, it is possible to use the defined track to determine how the second tool 6 must be positioned in relation to the first workpiece 2 axially (this positioning is denoted below as second axial position z2) and axially (this positioning is denoted below as second radial position x2).

The second tool 2 can be moved both parallel to the first spindle axis 5 and radially in relation to the first spindle axis 5. In order to effect the appropriate processing as defined by the defined track (see FIG. 3, for example), the drives of the second tool 6 must be appropriately controlled. In addition, in the case of the determination of the correct positioning of the second tool 6 in an axial direction, it must be taken into account dynamically at each instant at which first axial position z1 the first workpiece 2 is currently positioned. The correct axial position of the second tool 6 is yielded in the case of the example in accordance with FIG. 1 as the difference between the "particular" axial position z2 and the respectively current axial position z1 of the first spindle 4. This mode of procedure is also generally known to experts.

Figure 4:
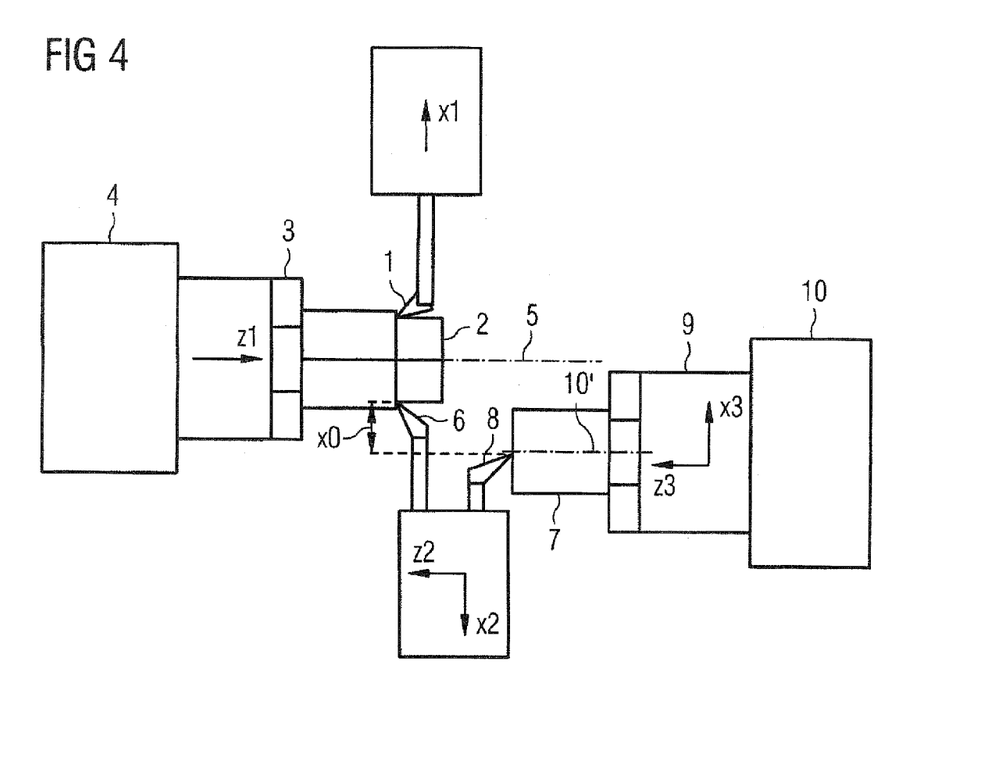
FIG. 4 shows a schematic illustration of another embodiment of a production machine.
Figure 5:
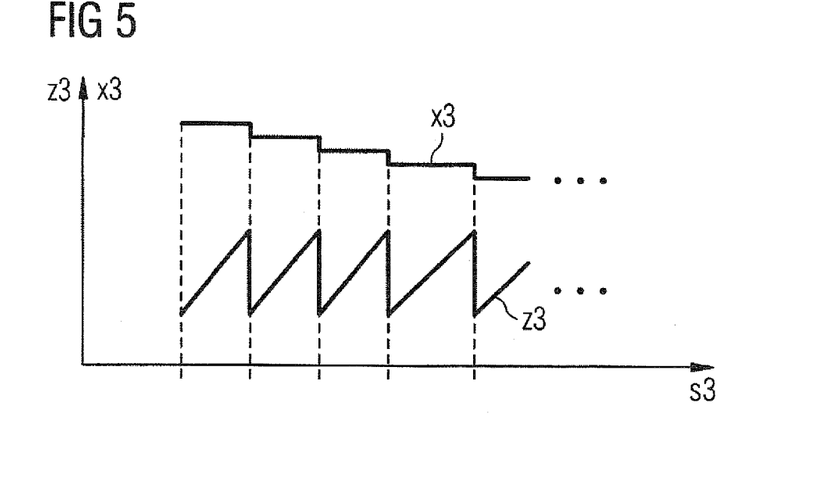
FIG. 5 shows a graphical illustration of another machining track.

It is possible in a similar way in accordance with FIG. 4 that a second workpiece 7 is processed simultaneously with the first workpiece 2 by using the first and the second tools 1, 6. The second workpiece 7 is processed with a third tool 8, which is moved together with the second tool 6.

The second workpiece 7 is clamped in a workpiece chuck 9 of a second spindle 10 for the purpose of processing and rotated about a second spindle axis 10'. In a fashion similar to the processing of the first workpiece 2 by the first and the second tools 1, 6, an appropriate track is defined as a function of a third travel path s3—see FIG. 5, purely by way of example. The track is used to control an axial and a radial drive of the second workpiece spindle 10. However, the radial and the axial positioning x2, z2 of the second tool 6 must also be taken into account for determining the respective current desired position values for the second workpiece spindle 10.

The tracks in accordance with the individual processing operations are programmed independently of one another. Consequently, desired value superposition occurs in the activation of the axial drive for the second tool 6 and in the activation of the drives of the second spindle 10. The dynamics of the individual movement requirements therefore overlap one another.

Each drive has a maximum possible dynamics. This holds true not only for the radial drive of the second tool 6 and the drives of the second workpiece spindle 10, but for all drives. Because of the validity for all drives, this statement also holds true, however, for the drives mentioned. The possible dynamics of the respective drive comprises both the possible range of movement and the possible time derivatives of the range of movement, such as the speed of movement, the acceleration of movement and, if appropriate, the movement jerk, as well as the possible torque and/or the possible force. In order for the axial drive of the second tool 6 and the drives of the second spindle 10, in particular, to be able to follow their desired position values, the activations of the appropriate drives by their appropriate desired position values must comply with the respective maximum possible dynamics.

Figure 6:
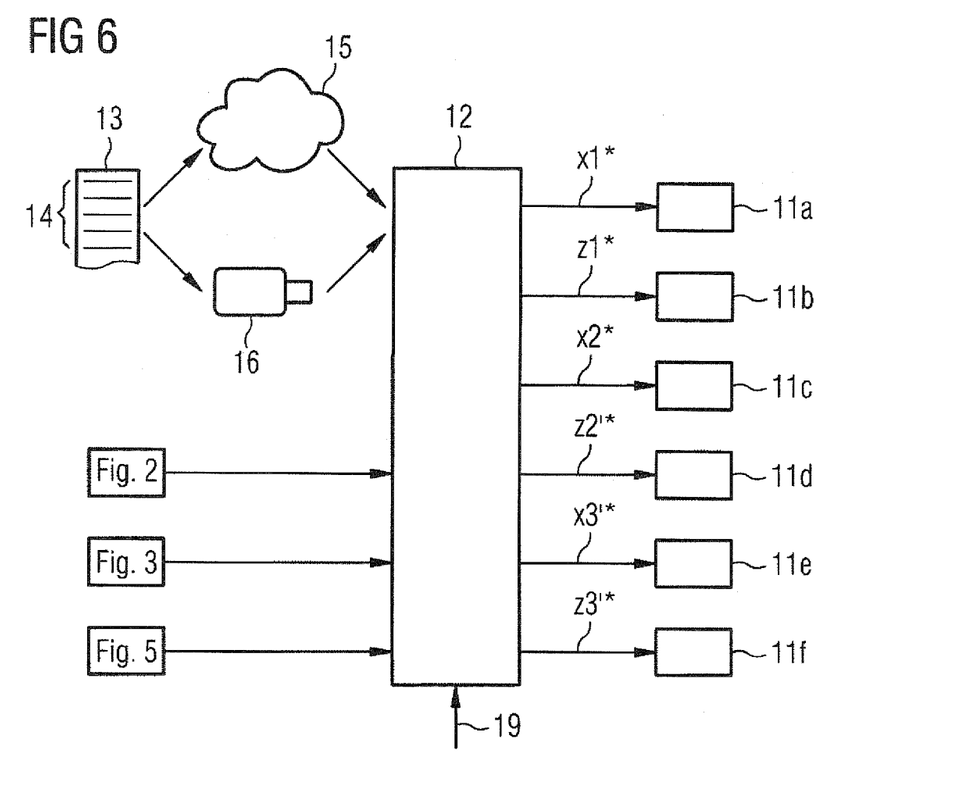
FIG. 6 shows a schematic illustration of yet another embodiment of a production machine.

FIG. 6 shows a production machine whose drives 11a to 11f are position-controlled. The desired values fed to the drives 11a to 11f are therefore desired position values x1*, x2*, x3'*, z1*, z2'*, z3'*. However, the present invention can equally be applied when the desired values are the first, second, third, etc. time derivative of desired position values, i.e., desired values of speed or rotational speed, desired acceleration values, desired jerk values, etc. The desired values fed to the drives 11a to 11f could also be desired values of torque or force. The subsequent discussion is therefore not restricted to application in the case of desired position values.

However, irrespective of the type of desired values used, the desired values should correspond to one another, or at least be similar. Thus, for example, it should uniformly be a case of desired speed values or of desired force values. A mixture of various types of desired values is, however, likewise possible.

According to the exemplary embodiment of FIG. 6, the drives 11a to 11f are position-controlled. Position control is performed via a control device 12 that is likewise a component of the production machine. The control device 12 is designed to control the drives 11a to 11f.

The number of drives 11a to 11f can vary depending on application. It is at least two. As a rule, more than two drives 11a to 11f are present. FIG. 6 shows six such drives 11a to 11f. This illustration is, however, purely exemplary.

The production machine can likewise be designed as required. It is assumed below that the production machine of FIG. 6 corresponds to the production machine that was explained above in conjunction with FIG. 4. In this case, each one of the drives 11a to 11f corresponds to a respective one of the drives that undertake the axial positioning z1 to z3 and undertake the radial positioning x1 to x3.

For the sake of completeness, it may further be mentioned that further drives can be present in addition to the illustrated, position-controlled drives 11a to 11f. These further drives are of no importance in the present invention, and are therefore not illustrated.

The control device 12 is generally designed as a software-programmable control device. The control device 12 is programmed in this case with an operating program 13. On the basis of the programming with the operating program 13, the control device 12 is configured in such a way that it carries out an operating method that is explained below in more detail.

In accordance with FIG. 6, the operating program 13 has machine code 14. The machine code 14 can be executed directly by the control device 12. The execution of the machine code 14 by the control device 12 has the effect that the control device 12 carries out the abovementioned operating method.

The operating program 13 can be fed to the control device 12 in various ways. For example, the operating program 13 can be fed to the control device 12 via a link to a computer network 15 (for example the World Wide Web). It is also possible for the operating program 13 to be stored on a mobile data medium 16 and to be fed to the control device 12 via the data medium 16. The mobile data medium 16 can be designed as required. FIG. 6 is a schematic of a configuration of the mobile data medium 16 as a USB memory stick. The data medium 16 could, however, alternatively be designed as a CD-ROM or as an SD memory card, for example.

Figure 7:
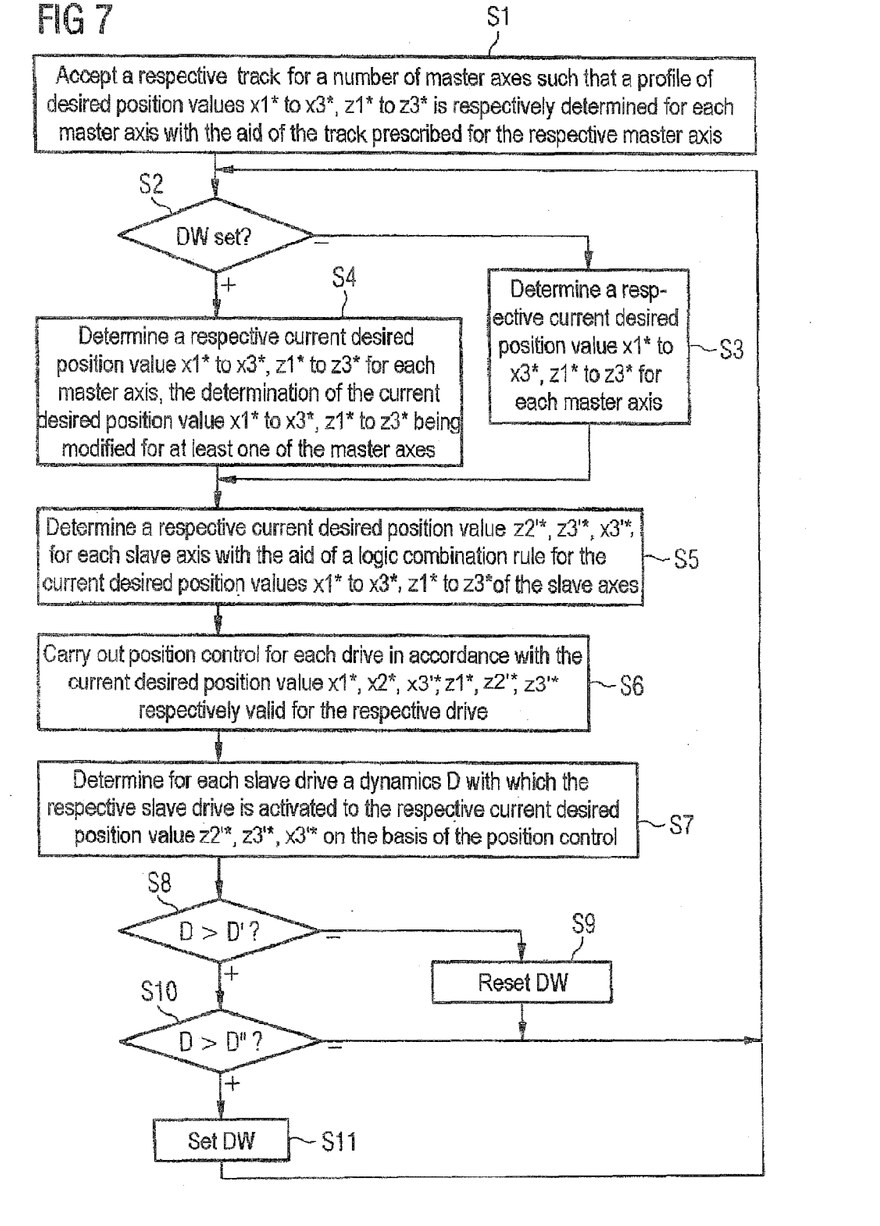
FIGS. 7 and 8 show flowcharts of a process for operating a control device.

In accordance with FIG. 7, the control device 12 is respectively assigned a track for a number of master axes in a step S1, the result being that a profile of desired position values x1* to x3*, z1* to z3* is respectively determined for each master axis with the track defined for the respective master axis. For example, as indicated in FIG. 6, tracks can be defined in accordance with FIGS. 2, 3 and 5.

The tracks are used to prescribe movements in the case of which the desired value profiles of a plurality of master axes are interpolated with one another. Depending on the nature of the individual case, however, it is equally possible to prescribe the desired value profiles independently of one another—partially or completely.

The control device 12 checks in a step S2 whether a data word DW is set. When the data word DW is not set, the control device 12 respectively determines for each master axis in a step S3 a current desired position value $x1^*$ to $x3^*$, $z1^*$ to $z3^*$. For example, for the three processing operations that were explained above in conjunction with FIG. 4, the control device 12 respectively determines their desired axial positioning $z1^*$ to $z3^*$ and their desired radial positioning $x1^*$ to $x3^*$.

When the data word DW is set, the control device 12 likewise respectively determines the current desired position value $x1^*$ to $x3^*$, $z1^*$ to $z3^*$ for each master axis in a step S4. As opposed to step S3, however, in the course of step S4 the determination of the current desired position value $x1^*$ to $x3^*$, $z1^*$ to $z3^*$ is modified by at least one of the master axes. The type of modification will be explained in more detail later.

In a step S5, the control device 12 respectively determines a current desired position value $z2'^*$, $z3'^*$, $x3'^*$ for each slave axis in accordance with a respective logic combination rule. In accordance with the exemplary embodiment, the current desired position values $x1^*$ to $x3^*$, $z1^*$ to $z3^*$ of the master axes feature in the logic combination rules. If appropriate, actual values of drives 11a to 11f can also feature in the logic combination rules. In each case, at least two values respectively feature in the logic combination rules, at least one of the values being a desired value $s1^*$ to $x3^*$, $z1^*$ to $z3^*$. The other value can alternatively be an actual value or a desired value $s1^*$ to $x3^*$, $z1^*$ to $z3^*$.

Step S5 is illustrated below with reference to the production machine in accordance with FIG. 4. As mentioned, however, the corresponding explanations serve only to illustrate. They are not to be understood as restrictive.

As explained above in conjunction with FIG. 4, for example, the positioning of the first spindle 4 in an axial direction must be taken into account in positioning the second tool 6 in an axial direction. The desired position value $z2'^*$ for the axial positioning of the second tool 6 is therefore yielded as $$z2'^* = z2^* - z1^*,$$

wherein $z2^*$ and $z1^*$ are the desired position values that are yielded in accordance with the programmed movement of the second tool 6 and in accordance with the programmed movement of the first spindle 4, in accordance with the defined respective tracks.

In a similar manner, the desired position value $z3'^*$ for the second spindle 10 is yield as $$z3'^* = z3^* + z2'^* = z3^* + z2^* - z1^*.$$

Equally, the desired position value $x3'^*$ for the radial positioning of the second spindle 10 is yielded as $$x3'^* = x3^* - x2^* - x0,$$

wherein $x0$ is a constant offset (see FIG. 4).

It is also to be seen from the above equation that instances of cascading can occur. Thus, for example, the desired position value $z2'^*$ is on the one hand the desired position value of a slave axis because it is determined from the desired position values $z1^*$ and $z2^*$. On the other hand, the desired position value $z2'^*$ is also a desired position value of a master axis, because it features in the determination of the desired position value $z3'^*$.

In accordance with the example explained above in conjunction with FIG. 4, the logic combination of the desired position values $x1^*$ to $x3^*$, $z1^*$ to $z3^*$ of the master axes is a simple additive logic combination. However, such a logic combination constitutes only the simplest case of a logic combination. Other logic combinations are also possible, for example nonlinear transformations or couplings that can, if appropriate, also be cascaded.

In a step S6, the control device 12 carries out control—here position control—for each drive 11a to 11f in accordance with the current desired position value $x1^*$, $x2^*$, $x3'^*$, $z1^*$, $z2'^*$, $z3'^*$ respectively valid for the respective drive 11a to 11f. The control device 12 thus controls the drives for the first spindle 4, the first tool 1 and the radial positioning of the second tool 2 (for example the drives 11a to 11c) in accordance with the current desired position value $z1^*$, $x1^*$, $x2^*$ determined for the respective drive 11a to 11c in step S3 or in step S4, and controls the drives for the axial positioning of the second tool 6 and the positioning of the second spindle 10 (for example, the drives 11d to 11f) in accordance with the current desired position value $z2'^*$, $z3'^*$, $x3'^*$ determined for the respective drive 11d to 11f in step S5. Thus, in accordance with this example, the drives 11a to 11c are master drives, while the drives 11d to 11f are slave drives.

In a step S7, the control device 12 determines for each slave drive 11d to 11f a dynamics D with the aid of which the respective slave drive 11d to 11f is controlled as a result of the position control of the respective current desired position value $z2'^*$, $z3'^*$, $x3'^*$.

In a step S8, the control device 12 checks whether the dynamics D is above a lower dynamics limit D' (if appropriate, specific to the drive). If this is not the case, the control device 12 proceeds to a step S9 in which it resets the data word DW.

Otherwise, the control device 12 checks in a step S10 whether the dynamics D is above an upper dynamics limit D" (if appropriate, specific to the drive). If this is not the case, no further measure is adopted. If, by contract, this is the case, the control device 12 sets the data word DW in a step S11.

The control device 12 returns to step S2 from each of steps S9, S10 (in the NO branch) and S11.

The type of modification of step S4 is to be seen, inter alia, from steps S8 to S11. The modification is such that in the course of step S4 the determination of the current desired position values $x1^*$ to $x3^*$, $z1^*$ to $z3^*$ is modified for at least one of the master axes in such a way that the corresponding slave drive 11d to 11f is controlled with a reduced dynamics D.

Steps S2 to S11 are carried out with a predetermined clock pulse. As a result, the consequence of the sequence of steps S2 to S11 is that the control device 12 checks in each clock pulse whether the dynamics D of the slave drives 11d to 11f falls below an upper dynamics limit D". When the upper dynamics limit D" is exceeded, starting from the next clock pulse the determination of the current desired position values $x1^*$ to $x3^*$, $z1^*$ to $z3^*$ for at least one of the master axes is modified in such a way that the relevant slave drive 11d to 11f is controlled with a reduced dynamics D. The modified determination of the current desired position values $x1^*$ to $x3^*$, $z1^*$ to $z3^*$ is retained until the reduced dynamics D of the relevant slave drive 11d to 11f falls below the lower dynamics limit D'.

The clock pulse can be determined as required. For example, it can be the interpolation clock pulse (as a rule every 2 ms) that is involved. Alternatively, it is possible to use a controller clock pulse, for example the position controller clock pulse (as a rule every millisecond), the rotational speed controller clock pulse (as a rule every 125 μs), or the current controller clock pulse (as a rule, likewise every 125 μs).

Figure 8:
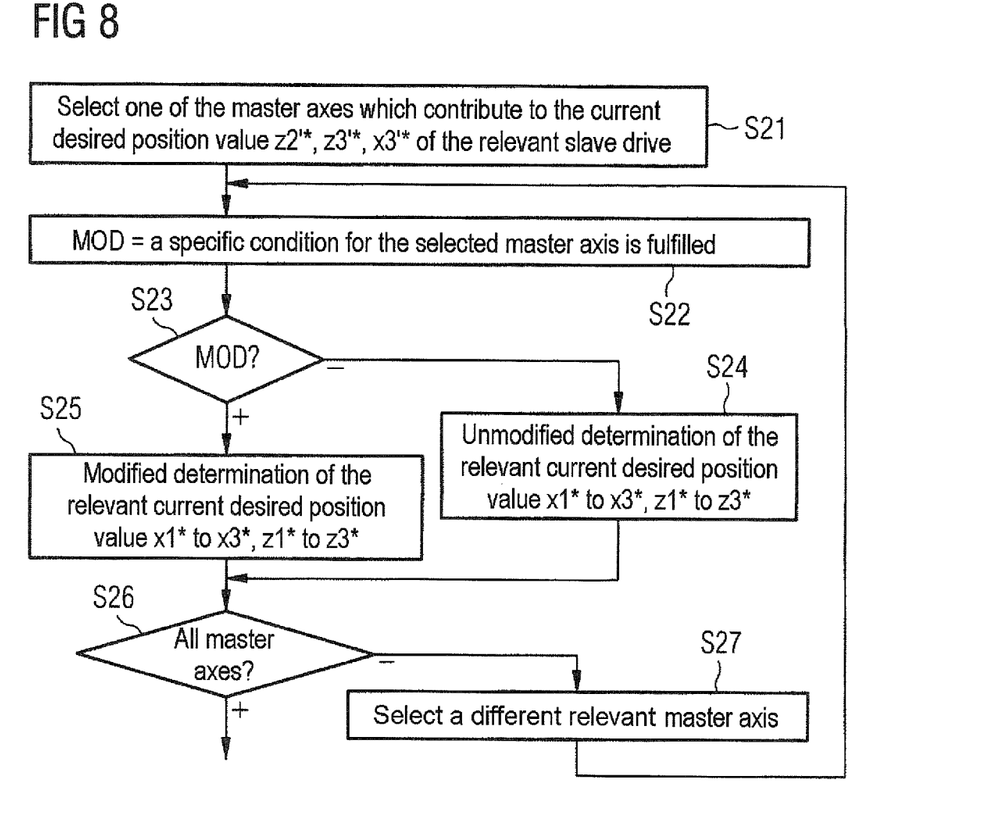

It is possible in principle to modify the determination of the current desired position values $x1^*$ to $x3^*$, $z1^*$ to $z3^*$ uniformly. It is equally possible in principle to determine, in a manner mutually dependent on the desired position values x1* to x3*, z1* to z3* of the master axes, which of the current desired position values x1* to x3*, z1* to z3* is to be determined in a modified way. It is, however, preferred that, in the case where the dynamics D with which the relevant slave drive 11d to 11f is controlled exceeds the upper dynamics limit D", the control device 12 decides for each of the master axes independently of the other master axes whether and, if appropriate, to what extent it modifies the determination of the current desired position values x1* to x3*, z1* to z3* for the respective master axis. This is explained below in more detail in conjunction with FIG. 8. Consequently, FIG. 8 shows a possible configuration of step S4 from FIG. 7. In accordance with FIG. 8, the control device 12 selects in a step S21 one of the master axes that contribute to the desired position value z2'*, z3'*, x3'* of the relevant slave drive 11d to 11f. The control device 12 determines the value of a logic variable MOD in a step S22. The logic variable MOD takes the value TRUE if, and only if, a specific condition is fulfilled for the selected master axis. Otherwise, the logic variable MOD assumes the value FALSE.

The value of the logic variable MOD is checked in a step S23. Depending on the result of the check of the step S23, a step S24 or a step S25 is alternatively carried out. An unmodified determination of the current desired position value x1* to x3*, z1* to z3* for the selected master axis is performed in step S24. A modified determination of the relevant current desired position value x1* to x3*, z1* to z3* is performed in step S25. Steps S24 and S25 therefore correspond to steps S3 and S4 of FIG. 7 with reference to the selected master axis.

In a step S26, the control device 12 checks whether it has already treated all master axes whose current desired position values x1* to x3*, z1* to z3* contribute to the current desired position value z2', x3'* of the relevant slave drive 11d to 11f. If this is not the case, the control device proceeds to a step. S27. The control device 12 selects another relevant master axis in step S27. It then returns to step S22. Otherwise, the method of FIG. 8 is terminated.

Figure 9:
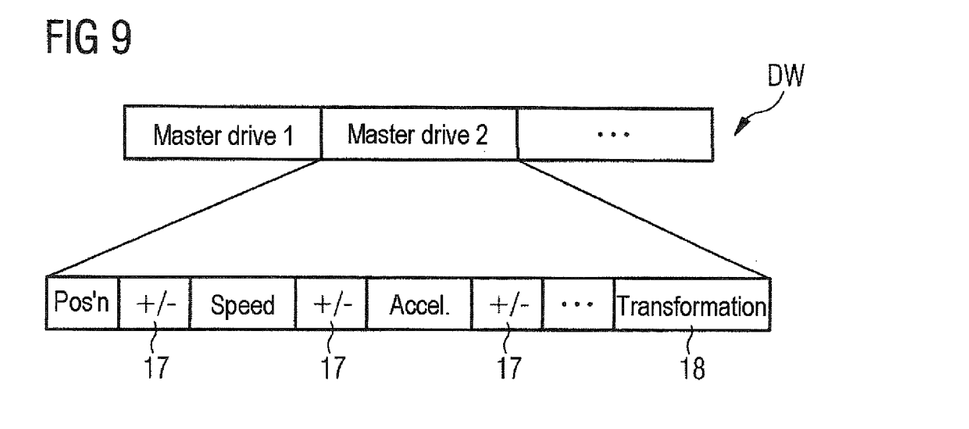
FIG. 9 shows a data word.
Figure 10:
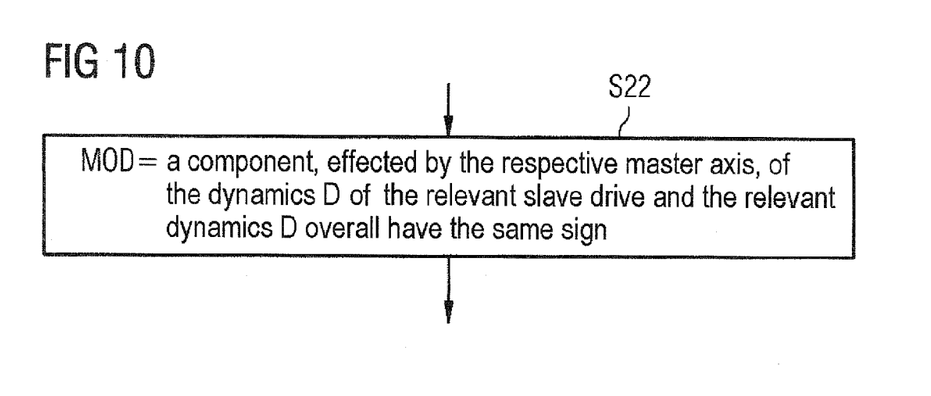
FIGS. 10 and 11 show flowcharts of a modified process.

A possible configuration of the condition specific to master axes is explained in conjunction with FIGS. 9 and 10.

For each dynamics category (position, speed, acceleration, jerk, force, torque, . . . ), the data word DW reset in step S9, set in step S11 and checked in step S2 can in the simplest case be a flag that can assume only two states, specifically "set" and "not set". However, the data word DW is preferably broken down in more detail in accordance with FIG. 9. In particular, in accordance with FIG. 9 the data word DW can additionally comprise per master axis—if appropriate, for each dynamics category—an item of information 17—called sign information item 17 below. The sign information item 17 specifies which sign of the considered dynamics category is critical. In the case of a movement, the sign information item 17 can, for example, specify whether a forward or backward movement of the respective master axis is critical. By way of example, in this case, step S22 of FIG. 8 can be configured in accordance with FIG. 10 in such a way that the logic variable MOD assumes the value TRUE only if a component, effected by the respective master axis, of the dynamics D of the relevant slave drive 11d to 11f and the relevant dynamics D overall have the same sign. Otherwise, the logic variable MOD assumes the value FALSE.

An example by way of illustration: it may be assumed that the slave drive 11d for the axial positioning z2 of the second tool 6 of FIG. 4 moves to the left at a speed v2 that exceeds the upper dynamics limit D". Thus |v2|>D" and sign v2=+1. In this case, an axial positioning of the first spindle 4 to the right is not critical, because this movement, which goes in the positive direction with reference to the axial positioning of the first spindle 4, features negatively in the axial positioning of the second tool 6. A reduction of a speed v1 for the first spindle 4 is not required in this case. If the first spindle 4, by contrast, moves to the left, a reduction of the speed v1 at which this movement is performed can be rational.

Figure 11:
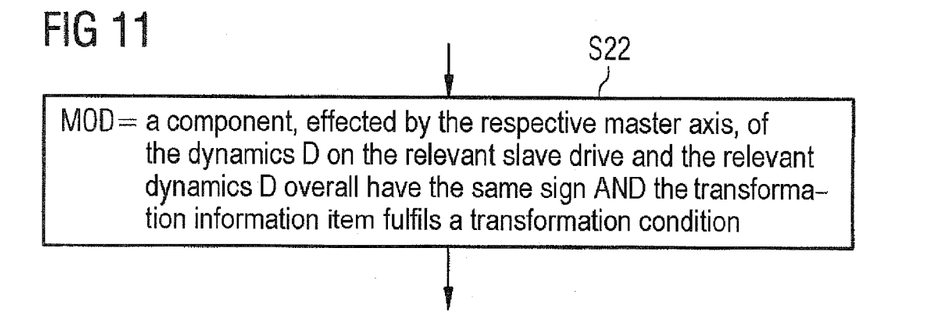

If appropriate, in accordance with FIG. 9, the data word DW can comprise for each master axis an additional information item 18, in addition to the sign information item 17, and this is called a transformation information item below. In this case, the step S22 of FIG. 8 can, for example, be configured in accordance with FIG. 11. In accordance with FIG. 11, in determining the logic variables MOD the control device 12 also takes account of the transformation information item 18 in addition to the sign information item 17. For example, when determining the current desired position values x1* to x3*, z1* to z3* for the relevant master axis, it is possible to undertake modification only if a transformation ratio defined by the transformation information item 18 exceeds a threshold value. Alternatively, the transformation information item 18 can be a flag that is set as a function of the transformation ratio. The transformation ratio is yielded by the quotient of the change in the relevant desired position values z2'*, z3'*, x3'*, which is effected by a change in the desired position values x1* to x3*, z1* to z3* of the relevant master axis.

Figure 12:
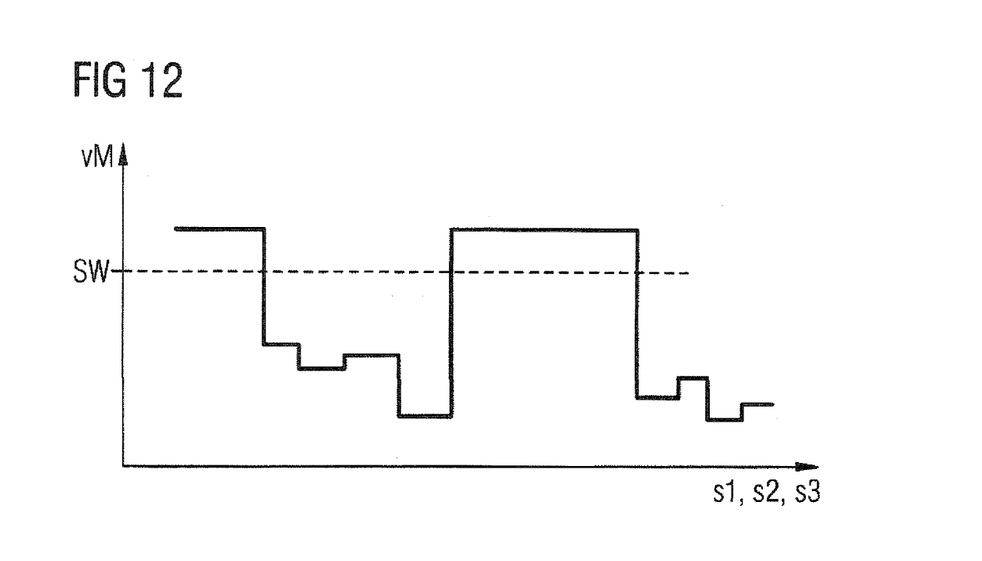
FIG. 12 shows a graphical illustration of a maximum speed profile.

As a rule, the control device 12 is not only provided with the profiles (see, for example, the tracks of FIGS. 2, 3 and 5), but additionally also maximum speeds vM at which the master axes are to be moved at the fastest. FIG. 12 illustrates by way of example a profile of the maximum speed vM for one of the tracks as a function of the relevant travel path S1 to S3. It is to be seen in particular from FIG. 12 that the maximum speed vM does not necessarily have to be constant, but can vary. In the event of variation, the value of the maximum speed vM can have a functional profile or be constant in some sections.

Figure 13:
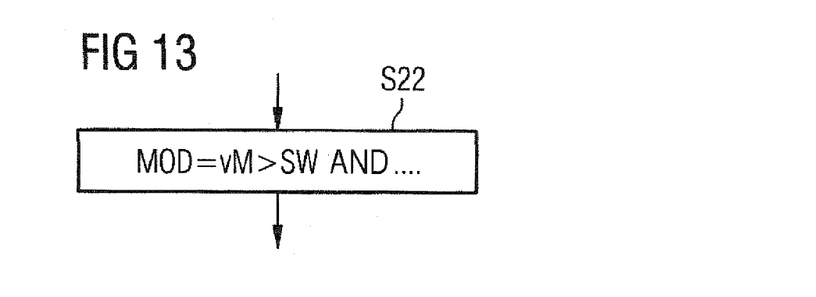
FIG. 13 shows a flowchart of realization of a logical variable in the process of FIG. 8.
Figure 14:
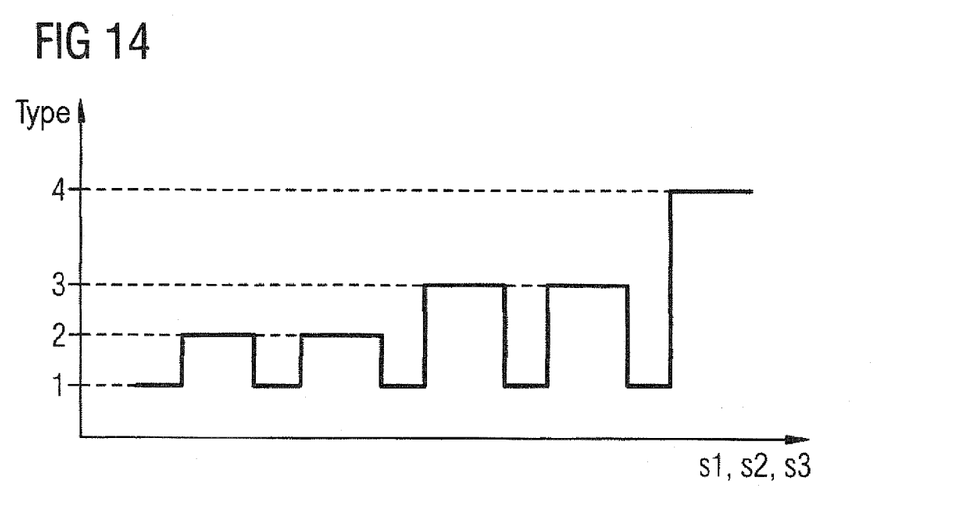
FIG. 14 shows a type profile of a modified process to realize the logical variable in the process of FIG. 8, and FIGS. 15 and 16 show flowcharts of the modified process to realize the logical variable in the process of FIG. 8.

Profiles that are similar in principle can also be defined for the acceleration and/or the force and the torque, if appropriate also for the jerk. However, particularly important in the context of the present invention is the maximum speed vM. This is because it is possible in principle to distinguish between two types of movements with reference to the production machine. The first type of movements are pure positioning actions, or travel movements during which no processing of the respective workpiece 2, 7 is performed by the respective tool 1, 6, 8. Such movements are performed as a rule in a so-called rapid traverse at high speed. By contrast, processing operations representing the other type of movements, are performed as a rule at substantially lower speeds. It is therefore possible to configure step S22 of FIG. 8 in accordance with FIG. 13 in such a way that the logic variable MOD assumes the value TRUE when the maximum speed vM at which the track assigned to the respective master axis is intended to be covered at its fastest (if appropriate, locally at this point of the track) is above a suitably selected threshold value SW. This configuration is an alternative or in addition to taking account of the sign information item 17 (be this with or without taking account of the transformation information item 18). Other types of determination of the logic variables MOD are also possible as an alternative or in addition. Thus, in accordance with FIG. 14, for example, the instantaneous movement operation can be defined for sections of each track. For example, said operations may be divided into the following types:

1=rapid traverse,
2=coarse processing (for example roughing),

3=fine processing (for example finishing), and
4=final processing (for example polishing).

Figure 15:
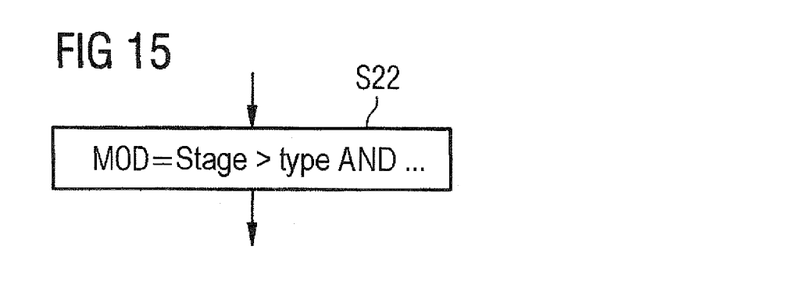

In such a case, the data word DW should permit an appropriate graduation at least for the dynamics category of "speed", i.e., likewise have a value range of from 1 to 5 in accordance with the above-named types. In this case, step S22 from FIG. 8 can be configured in accordance with FIG. 15 in such a way that the logic variable MOD assumes the value TRUE as a function of whether the instantaneous type of the respective processing is greater than the step determined for the relevant slave drive $11d$ to $11f$ (1=no problem, 2=reduced rapid traverse movements, 3=reduced coarse processing operations, ...). For example, at first only a reduction of rapid traverse movements may be required. Only when this turns out to be insufficient are coarse processing operations also reduced, etc. This configuration can also be combined with the configurations of FIGS. 9 to 13.

Figure 16:
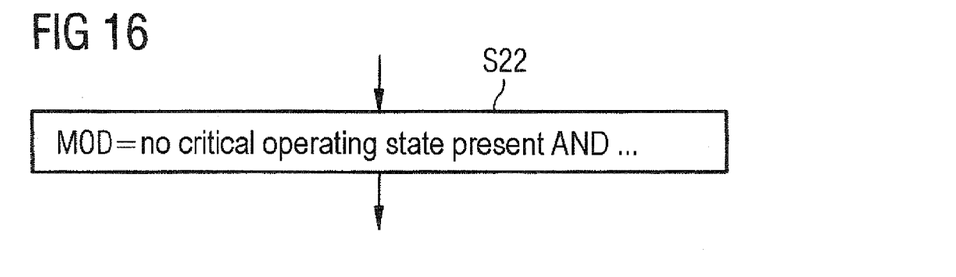

Finally, critical operating states can occur during the operation of the production machine which forbid for reasons of a higher order the reduction of a corresponding dynamics of a master drive $11a$ to $11c$ or of a slave drive $11d$ to $11f$. For example, it can be necessary to remove a tool 1, 6, 8 rapidly from its processing position at which it bears against the workpiece 2, 7. Step S22 of FIG. 8 therefore preferably also comprises in accordance with FIG. 16 interrogation as to whether such a critical operating state is present. During control of the drives $11a$ to $11f$, the control device 12 is fed—see FIG. 6—information items 19, called additional information items 19 below. Using the additional information items fed to it, the control device 12 determines whether there is a critical state of at least one master axis or of at least one drive $11a$ to $11f$. The question of whether a critical state of at least one master axis or of at least one drive $11a$ to $11f$ is present is also taken into account by the control device 12 when deciding whether and to what extent it modifies the determination of the current desired position values x1* to x3*, z1* to z3* for the master axes.

In the simplest case, it is determined directly and immediately with the information items 19 that are fed whether a critical state obtains. For example, a corresponding command can be defined. Alternatively, the control device 12 can combine the defined information items 19 with one another.

It is possible that the modes of procedure explained above are always carried out unconditionally. Alternatively, it is possible to enable or block them on the basis of an appropriate parameterization individually or in groups. Again, parts of specific processing operations can be permanently assigned a specific dynamics component in advance by programmed assignment.

The present invention has many advantages. In particular, it is possible as a rule to work with full dynamics D of the slave drives $11d$ to $11f$. A reduction in the dynamics D of the slave drives $11d$ to $11f$ is required only in the individual case, and thus as seldom as possible. Nevertheless, it is possible to process with an optimized level of quality, in particular.

The above description serves exclusively to explain the present invention. By contrast, the scope of protection of the present invention is intended to be determined exclusively by the attached claims.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An operating method for a control device, comprising the steps of:
    defining profiles of desired values for a plurality of master axes,
    determining for each master axis a current desired value at a predetermined clock pulse and determining a current desired value for a slave axis with a logic combination rule, said logic combination rule including at least one current desired value of one of the master axes, and at least one desired or actual value of a second drive,
    controlling with the control device, at the predetermined clock pulse, a first drive in accordance with the current desired value of the slave axis, checking with the control device at each clock pulse when a dynamics, which controls the first drive to the current desired value of the slave axis, exceeds an upper dynamics limit, and when the dynamics controlling the first drive exceeds the upper dynamics limit, starting at a next clock pulse to modify the current desired values for at least one of the master axes, controlling the first drive with a reduced dynamics until the reduced dynamics falls below a lower dynamics limit, and independently
    determining for the at least one of the master axes whether to modify the current desired values for the at least one master axis.

2. The operating method of claim 1, wherein when the dynamics controlling the first drive exceeds the upper dynamics limit, further comprising modifying the current desired values for the at least one master axis only when a component of a dynamics caused by the at least one master axis and used to control the first drive and the dynamics driving the first drive have identical mathematical sign.

3. The operating method of claim 2, wherein when the dynamics controlling the first drive exceeds the upper dynamics limit, further comprising modifying the current desired values for the at least one master axis as a function of a transformation ratio which determines a change of the desired values for the slave axis caused by a change in the desired values for the at least one master axis.

4. The operating method of claim 1, further comprising steps of defining, in addition to the profiles, maximum speeds at which the master axes are to be moved, and taking into consideration for each of the at least one of the master axes, when deciding whether and to which extent to modify the current desired values, the maximum speed for the at least one master axis.

5. The operating method of claim 1, further comprising steps of defining types for the plurality of master axes, in addition to the profiles, and taking into consideration for each of the at least one of the master axes, when deciding whether and to which extent to modify the current desired values of the at least one of the master axes, the type of the at least one master axis.

6. The operating method of claim 1, further comprising steps of supplying information to the control device while the control device is controlling the first drive, determining from the information whether at least one master axis or at least one drive is in a critical state, and taking into consideration for each master axis, when deciding whether and to which extent to modify the current desired values, whether the at least one master axis or the at least one drive is in a critical state.

7. The operating method of claim 1, wherein the desired values of the at least one of the master axes are desired position values, a time derivative of desired position values, desired torque values or desired force values.

8. The operating method of claim 1, wherein the desired values of the at least one of the master axes are of identical type.

9. An operating program embodied in a non-transitory machine readable medium and comprising machine code, wherein the operating program when loaded into a control device and executed by the control device, causes the control device to execute the following steps:
defining profiles of desired values for a plurality of master axes,
determining for each master axis a current desired value at a predetermined clock pulse and determining a current desired value for a slave axis with a logic combination rule, said logic combination rule including at least one current desired value of one of the master axes, and at least one desired or actual value of a second drive,
controlling with the control device, at the predetermined clock pulse, a first drive in accordance with the current desired value of the slave axis, checking with the control device at each clock pulse when a dynamics, which controls the first drive to the current desired value of the slave axis, exceeds an upper dynamics limit, and when the dynamics controlling the first drive exceeds the upper dynamics limit, starting at a next clock pulse to modify the current desired values for at least one of the master axes, controlling the first drive with a reduced dynamics until the reduced dynamics falls below a lower dynamics limit, and independently
determining for the at least one of the master axes whether to modify the current desired values for the at least one master axis.

10. A non-transitory data medium storing an operating program in machine-readable form, which program when loaded into a control device and executed by the control device, causes the control device to execute the following steps:
defining profiles of desired values for a plurality of master axes,
determining for each master axis a current desired value at a predetermined clock pulse and determining a current desired value for a slave axis with a logic combination rule, said logic combination rule including at least one current desired value of one of the master axes, and at least one desired or actual value of a second drive,
controlling with the control device, at the predetermined clock pulse, a first drive in accordance with the current desired value of the slave axis, checking with the control device at each clock pulse when a dynamics, which controls the first drive to the current desired value of the slave axis, exceeds an upper dynamics limit, and when the dynamics controlling the first drive exceeds the upper dynamics limit, starting at a next clock pulse to modify the current desired values for at least one of the master axes, controlling the first drive with a reduced dynamics until the reduced dynamics falls below a lower dynamics limit, and independently
determining for the at least one of the master axes whether to modify the current desired values for the at least one master axis.

11. A control device for controlling a drive, comprising:
means for defining profiles of desired values of a plurality of master axes,
means for determining for each master axis a current desired value at a predetermined clock pulse and determining a current desired value for a slave axis with a logic combination rule, said logic combination rule including at least one current desired value of one of the master axes, and at least one desired or actual value of a second drive,
means for controlling with the control device, at the predetermined clock pulse, a first drive in accordance with the current desired value of the slave axis,
means for checking with the control device at each clock pulse when a dynamics, which controls the first drive to the current desired value of the slave axis, exceeds an upper dynamics limit, and when the dynamics controlling the first drive exceeds the upper dynamics limit, starting at a next clock pulse to modify the current desired values for at least one of the master axes, controlling the first drive with a reduced dynamics until the reduced dynamics falls below a lower dynamics limit, and independently determining for the at least one of the master axes whether to modify the current desired values for the at least one master axis.

12. A production machine comprising a plurality of drives for moving a workpiece or tool along one or more axes, and a control device according to claim 11 for controlling a position of the plurality of drives.

* * * * *